United States Patent
Picard et al.

(10) Patent No.: US 9,442,039 B2
(45) Date of Patent: Sep. 13, 2016

(54) EQUIPMENT FOR MEASURING PISTON RINGS

(71) Applicant: FEDERAL-MOGUL BURSCHEID GMBH, Burscheid (DE)

(72) Inventors: Jens Picard, Wuppertal (DE); Frank Horn, Burscheid (DE); Marc Stephan Klopp, Radevormwald (DE); Ulrich Lenhoff, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 81 days.

(21) Appl. No.: 14/378,170

(22) PCT Filed: Jan. 15, 2013

(86) PCT No.: PCT/DE2013/000028
§ 371 (c)(1),
(2) Date: Aug. 12, 2014

(87) PCT Pub. No.: WO2013/120471
PCT Pub. Date: Aug. 22, 2013

(65) Prior Publication Data
US 2015/0000150 A1    Jan. 1, 2015

(30) Foreign Application Priority Data
Feb. 18, 2012 (DE) .......... 10 2012 003 321

(51) Int. Cl.
*G01B 5/02* (2006.01)
*G01M 13/00* (2006.01)
*G01B 5/00* (2006.01)
*G01B 5/24* (2006.01)

(52) U.S. Cl.
CPC ............ *G01M 13/005* (2013.01); *G01B 5/003* (2013.01); *G01B 5/0004* (2013.01); *G01B 5/243* (2013.01)

(58) Field of Classification Search
CPC .......................... G01M 13/005; G01B 5/003
USPC .......................................................... 33/605
See application file for complete search history.

(56) References Cited

U.S. PATENT DOCUMENTS

| 1,332,571 | A | * | 3/1920 | Frederick | G01B 3/34 33/605 |
|---|---|---|---|---|---|
| 1,611,441 | A | * | 12/1926 | Higgins | G01B 5/08 33/555.1 |
| 1,703,873 | A | * | 3/1929 | Farmer | G01M 13/005 33/605 |
| 1,865,388 | A | * | 6/1932 | Ralph | G01B 5/0002 269/203 |
| 4,325,125 | A |   | 4/1982 | Buchfeld | |
| 4,326,336 | A |   | 4/1982 | Hreha | |
| 4,864,733 | A | * | 9/1989 | Gillberg | G01M 13/005 33/555.4 |
| RE34,078  | E | * | 9/1992 | Hesseltine | G01B 5/004 33/549 |

(Continued)

FOREIGN PATENT DOCUMENTS

| DE | 29 51 605 | 7/1981 |
|---|---|---|
| DE | 196 05 776 | 8/1997 |

(Continued)

*Primary Examiner* — Christopher Fulton
(74) *Attorney, Agent, or Firm* — Norris McLaughlin & Marcus, P.A.

(57) ABSTRACT

A device for measuring edge and rounding features on a piston ring includes a planar support element for the piston ring, a stop operatively connected thereto for bearing defined piston ring sections thereon, and a measuring unit, which is disposed at a predefinable angle with respect to the support element or the stop.

7 Claims, 2 Drawing Sheets

(56) References Cited

U.S. PATENT DOCUMENTS

Figure 1:
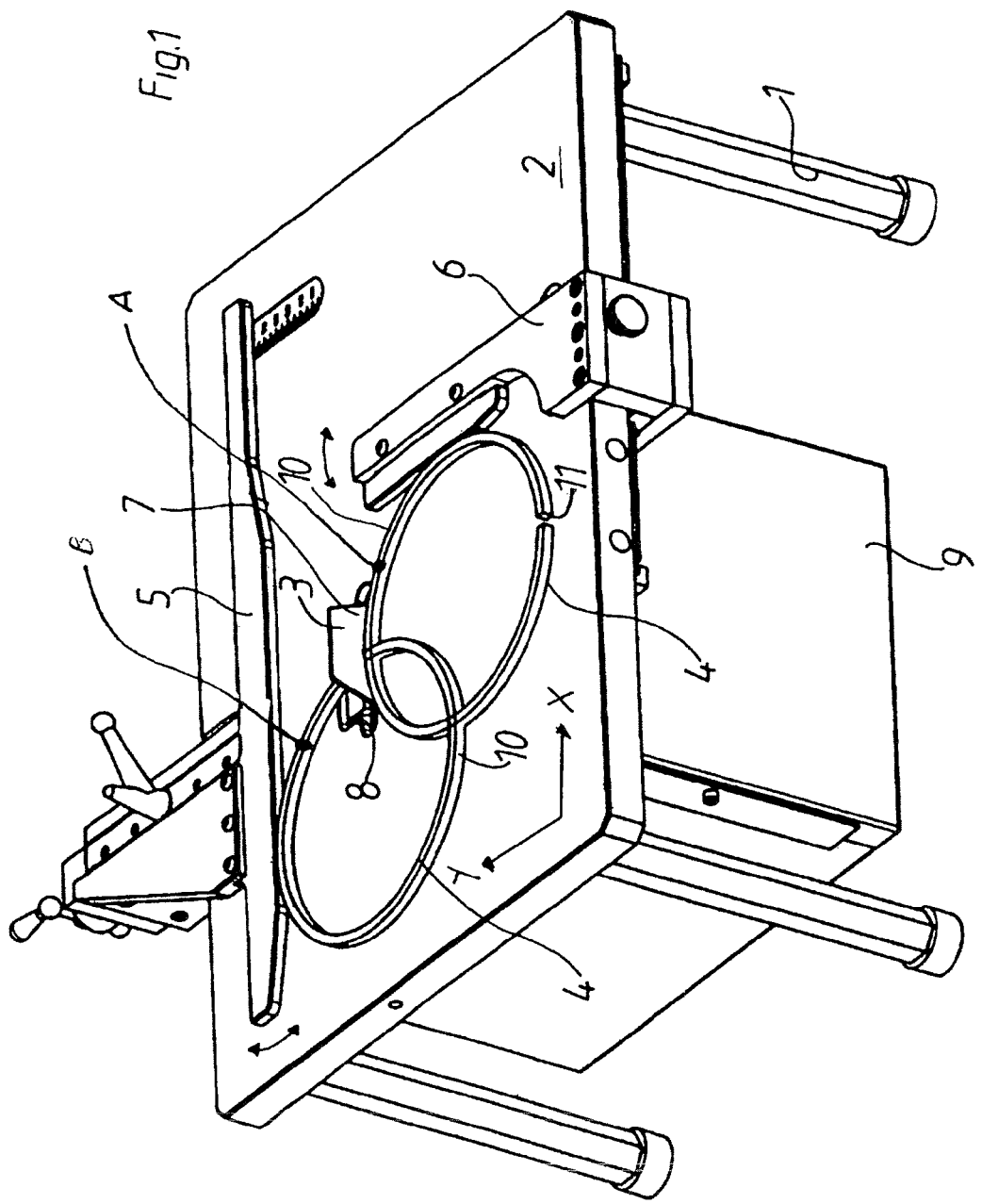

| | | | | | |
|---|---|---|---|---|---|
| 5,216,818 | A | * | 6/1993 | Rucinski | G01B 3/22 33/542 |
| 5,343,627 | A | * | 9/1994 | Hesseltine | G01B 5/245 33/535 |
| 5,375,340 | A | * | 12/1994 | Gerritsen | G01B 5/24 33/1 N |
| 5,687,487 | A | * | 11/1997 | Johnson | G01B 7/345 33/501.02 |
| 5,848,477 | A | | 12/1998 | Wiedmann et al. | |
| 6,196,063 | B1 | * | 3/2001 | Kasai | G01M 13/005 33/605 |
| 6,901,676 | B1 | * | 6/2005 | Macke | G01B 5/252 33/550 |
| 8,964,023 | B2 | * | 2/2015 | Neumann | G01B 21/02 348/135 |
| 2002/0170199 | A1 | | 11/2002 | Ruijl | |

FOREIGN PATENT DOCUMENTS

| | | | | |
|---|---|---|---|---|
| DE | 200 17 509 | | 12/2000 | |
| DE | 102 27 884 | | 1/2004 | |
| DE | 102010001717 | * | 7/2011 | G01M 13/005 |

* cited by examiner

EQUIPMENT FOR MEASURING PISTON RINGS

BACKGROUND OF THE INVENTION

The invention relates to a device for measuring edge and rounding features on a piston ring.

DE 200 17 509 U1 discloses a device for measuring the chamfer length of chamfered workplaces, comprising a distance measuring device, which is connected to a measuring feeler, and further comprising a support for the workplace and a stop, which is provided over the longitudinal extension of this support and serves as a sliding stop for the workpiece. The measuring feeler has a stylus shape comprising a stop pin and a conical section adjoining thereon, wherein the measuring feeler is mounted so as to be displaceable in the longitudinal direction approximately perpendicularly to the support and, in the measuring position is located, with the transition point thereof between the stop pin and the conical section, on the chamfer edge of the workplace, between the stop end face of the same and the chamfer surface. The workpiece support is formed by a flat plate, which includes a passage for the measuring feeler, preferably approximately in the center thereof.

DE 102 27 884 A1 discloses a device for carrying out measurements, in particular on heavy workpieces, wherein the device comprises a distance measuring device, which is connected to a measuring feeler, and further comprising a support for the workpiece and a stop, which is provided over the longitudinal extension of this support and serves as a sliding stop for the workpiece. The measuring feeler is provided on a pivot arm, which can be pivoted in a plane that extends perpendicularly to the support plane, wherein the longitudinal axis of the measuring feeler is oriented parallel to the support plane, and wherein the sliding stop runs parallel to the pivot plane of the pivot arm. The measuring feeler has a stylus shape comprising a stop pin and a conical section adjoining thereon.

Presently, the geometries of running face edges and joint faces on piston rings are determined and evaluated using different measuring devices. While the running faces can be measured during production by way of running face profile measuring devices, the measurement and evaluation of the joint faces cannot take place during production. These rounding features in the joint region must be captured in a time-intensive process using contour measuring devices, wherein an evaluation of the edge geometry takes place manually.

SUMMARY OF THE INVENTION

It is the object of the invention to provide a device for universally measuring edge and rounding features on a piston ring, and more particularly of the running face edges and joint faces, the device having a simple design, and allowing the respective running face edges and joint faces to be measured during production and the measurement values to be evaluated automatically.

This object is achieved by a device for measuring edge and rounding features on a piston ring, comprising a planar support element for the piston ring, a stop operatively connected thereto for bearing defined piston ring sections thereon, and a measuring unit, which is disposed at a predefinable angle with respect to the support element or the stop.

The stop is preferably situated perpendicularly on the base surface of the support element.

This object is achieved by disposing the measuring device beneath the support element, wherein on the stop side a recess is introduced into the support element, via which the edge and rounding features of the piston ring are measured, wherein the measuring unit is disposed beneath the support element at an angle of 45°.

So as to correctly align the respective piston ring in the X and Y directions, guide elements are used with regard to different outer piston ring diameters, the guide elements being movable relative to the support element and being detachably operatively connected thereto.

The measuring process can be carried out both in a contact manner, for example by way of a measuring feeler, and in a non-contact manner. The measurement of the running face edges and also of the ring side face, toward the joint face, can thus be carried out during production using one and the same measuring unit, wherein the evaluation takes place automatically in an operator-independent manner.

Figure 2:
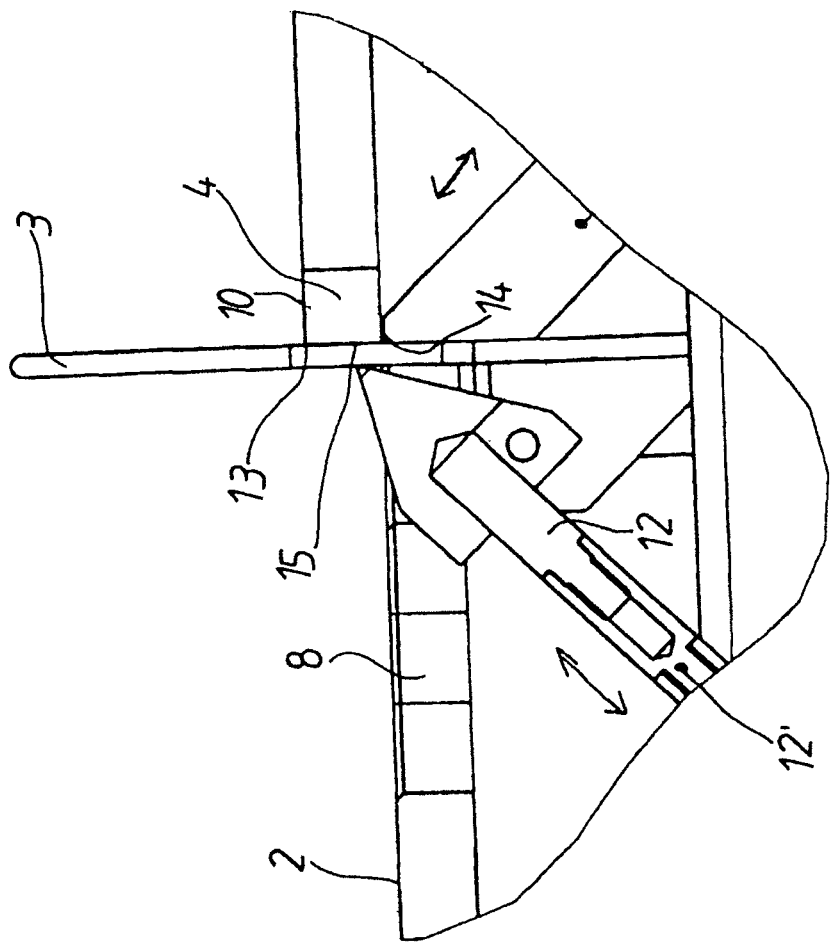

The subject matter of the invention is shown in the drawings based on an exemplary embodiment and is described as follows. Brief Description of the Drawings In the drawings:

FIG. 1 is a schematic diagram of a device according to the invention for measuring edge and rounding features on a piston ring; and FIG. 2 is a partial illustration of the measuring region according to FIG. 1.

DETAILED DESCRIPTION OF THE INVENTION

FIG. 1 shows a measuring table 1, comprising a planar support element 2. A stop 3 is mounted on the visible surface of the support element 2, the stop being substantially perpendicular to this surface, The measuring object is a piston ring 4, which is placed with one of the end faces (ring side faces) thereof on the support element 2. Guide elements 5, 6, by way of which different piston ring faces can be brought into operative connection with the stop 3, are provided for adaptation to different piston ring diameters.

This figure shows two different measuring processes, In measuring process A, the running face (or what will be the later running face) 7 of the piston ring 4 is manually pressed against the stop 3 via the guide element 6 (as a function of the diameter). On the stop side, the support element 2 comprises a recess 8. As is shown in more detail in FIG. 2, a measuring unit 12 is positioned beneath the support element 2, the measuring unit 12 being disposed at a predefinable angle beneath the support element 2 within a case 9. In this measuring position, the ring side faces 10, toward the running face 7, can be measured.

During measuring process B, the piston ring 4 is positioned relative to the stop 3 by the guide element 5, so that the measuring unit shown in FIG. 2 and the recess 8 can be used to check four edges, these being the ring side faces 10, toward the joint face 11, with respect to the edge and rounding features thereof.

FIG. 2 shows a partial view of the support element 2 in the region of the measuring unit 12, which is positioned at an angle of 45° beneath the support element 2, forming a measuring axis 12'.

The piston ring 4 is also apparent, more particularly in measuring process A. In this position, the running face edge 13, 14, which is to say the transition region from the ring side 10 to the running face 15, can be measured. As was already shown in FIG. 1, the support element 2 is provided with a recess 8 in the region of the measuring unit 12. In addition, the stop 3 can be seen.

It is thus possible, using one and the same measuring unit 12, to check a plurality of edges on piston rings 4, and more particularly during production, whereby the evaluation is carried out automatically in all measuring processes.

The invention claimed is:

1. A device for measuring edge and rounding features on a piston ring, comprising:
    a planar support element having an outer planar surface configured to support a piston ring lying flat on said outer planar surface at a first ring side face;
    a stop operatively connected to the planar support element to bear against a running surface of the piston ring, the running surface being different from the first ring side surface;
    a measuring unit which is disposed at a predefinable angle with respect to the support element or the stop;
    wherein the measuring unit is disposed beneath the outer planar surface of the planar support element; and
    wherein, on the stop side, the support element has a recess via which running-surface edge features and rounding features of the piston ring lying on said outer planar surface are measured; and
    wherein the measuring unit is arranged beneath the support element at an angle of 45% relative to the plane of the support.

2. A process for measuring edge and rounding features on a piston ring, comprising measuring the features with the device according to claim 1, wherein the measuring process is carried out in a contact manner by way of a measuring feeler.

3. A process for measuring edge and rounding features on a piston ring, comprising measuring the features with the device according to claim 1, wherein the measuring process is carried out in a non-contact manner.

4. A process for measuring edge and rounding features on a piston ring, comprising measuring the features with the device according to claim 1, wherein the evaluation of results of the measuring takes place in an automated manner.

5. A device for measuring edge and rounding features on a piston ring, comprising
    a planar support element for the piston ring,
    a stop operatively connected thereto for bearing defined piston ring sections thereon, and
    a measuring unit which is disposed at a predefinable angle with respect to the support element or the stop,
    wherein the measuring unit is disposed beneath the support element,
    wherein, on the stop side, the support element has a recess via which edge and rounding features of the piston ring are measured,
    wherein the measuring unit is arranged beneath the support element at an angle of 45% relative to the plane of the support, and
    wherein the stop is positioned substantially perpendicularly on the support element.

6. A device for measuring edge and rounding features on a piston ring, comprising
    a planar support element for the piston ring,
    a stop operatively connected thereto for bearing defined piston ring sections thereon, and
    a measuring unit which is disposed at a predefinable angle with respect to the support element or the stop,
    wherein the measuring unit is disposed beneath the support element,
    wherein, on the stop side, the support element has a recess via which edge and rounding features of the piston ring are measured, and
    wherein the measuring unit is arranged beneath the support element at an angle of 45% relative to the plane of the support, and
    further comprising guide elements operatively connected to the support element and movable relative to the support element for aligning the piston ring in X and Y directions as a function of the outer diameter of the piston ring.

7. The device according to claim 6, wherein at least the support element, the stop, the guide elements and the measuring unit form part of a measuring table.

* * * * *